US006978677B2

(12) United States Patent
Bajram

(10) Patent No.: US 6,978,677 B2
(45) Date of Patent: Dec. 27, 2005

(54) APPARATUS FOR MEASURING ULTRASONIC POWER

(75) Inventor: Zeqiri Bajram, Teddington (GB)

(73) Assignee: The Secretary of State for Trade and Industry in Her Britannic Majesty's Government of the United Kingdom of Great Britain and Northern Ireland, London (GB)

( * ) Notice: Subject to any disclaimer, the term of this patent is extended or adjusted under 35 U.S.C. 154(b) by 0 days.

(21) Appl. No.: 10/495,401

(22) PCT Filed: Oct. 25, 2002

(86) PCT No.: PCT/GB02/04852

§ 371 (c)(1),
(2), (4) Date: Sep. 16, 2004

(87) PCT Pub. No.: WO03/044473

PCT Pub. Date: May 30, 2003

(65) Prior Publication Data

US 2005/0016282 A1 Jan. 27, 2005

(30) Foreign Application Priority Data

Nov. 16, 2001 (GB) .................................. 0127529

(51) Int. Cl.[7] .......................... G01H 11/06; G01H 3/12
(52) U.S. Cl. ......................................... 73/647; 73/646
(58) Field of Search ......................... 73/646, 647, 632, 73/643

(56) References Cited

U.S. PATENT DOCUMENTS

| 4,323,077 A | 4/1982 | Smith ........................ 128/660 |
| 5,508,546 A * | 4/1996 | Zalameda et al. .......... 374/117 |
| 5,962,773 A | 10/1999 | Cho ............................ 73/1.86 |
| 6,469,302 B1 * | 10/2002 | Kubo et al. .............. 250/338.1 |

FOREIGN PATENT DOCUMENTS

GB          1003985           9/1965

OTHER PUBLICATIONS

"The Thermoacoustic Effect and Its Use in Ultrasonic Power Determination" by Fay et al., Elsevier Ultrasonics 34 (1996), 563-566.

"Time Response Modelling of an Ultrasonic Thermoelectric Probe" by Romdhane et al., Elsevier Ultrasonics 34 (1996) 835-845.

* cited by examiner

Primary Examiner—John E. Chapman
(74) Attorney, Agent, or Firm—Sheridan Ross P.C.

(57) ABSTRACT

An ultrasonic power meter is provided for measuring ultrasonic power emitted by a device (18) under test. The meter includes a casing forming a chamber (16) within which an ultrasonic absorber (14) formed from polyurethane material is located. Overlying the absorber (14) is a membrane (12) of polyvinylidene fluoride which acts as a pyroelectric detector. The meter also includes a transfer medium (10), typically water, for allowing the transfer of ultrasonic energy emitted from a device (18) under test to the meter.

15 Claims, 1 Drawing Sheet

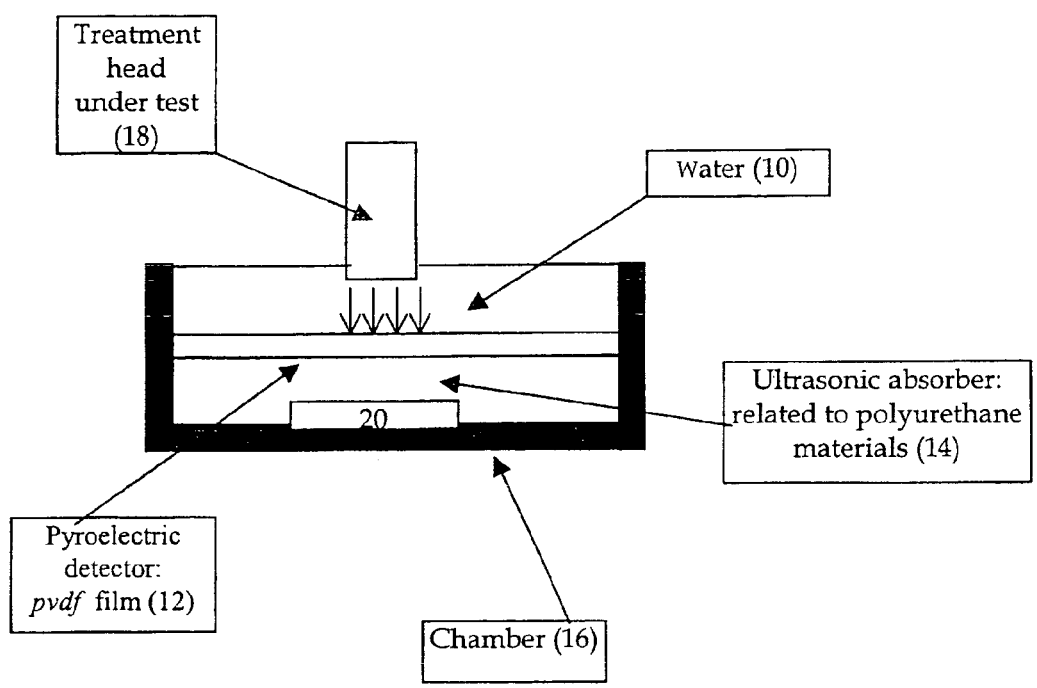

APPARATUS FOR MEASURING ULTRASONIC POWER

The present invention relates to an ultrasonic power meter, for use, for example, in measuring ultrasonic power being delivered by physiotherapy ultrasound machines.

Ultrasonic machines of this type are widely applied within hospitals in the United Kingdom and elsewhere for the treatment of soft-tissue injuries. The treatment heads used are coupled to the body using a water-based gel and ultrasonic power is delivered to the clinical site of interest.

Several equipment surveys carried out world-wide has long indicated that the calibration status of the type of equipment is extremely poor, with systems frequently operating outside of the permissible tolerances for the ultrasonic power and/or ultrasonic intensity. A strong contributory factor to this is the fact that at the user level (physiotherapist) there are no simple tests by which the acoustic power delivered by the treatment head can be verified in a traceable manner.

High quality (radiation) force balances exist, but the devices which are commercially available are generally bulky, being built around a top-loading chemical balance and also require the input of a reasonably skilled operator. The measurement systems currently available typically cost from £1,500 to £2,500. Although simpler, deflecting vane type force balances exist and represent a cheap way of estimating output power, these measurements are not traceable and still remain too difficult to implement at a user level.

These prior art techniques are thus too complex to provide the rapid, lower cost measurement capability required for implementation at the user level.

The present invention seeks to provide means for measurement of the power of such equipment and other ultrasonic emitters.

According to an aspect of the present invention, there is provided an apparatus for measuring ultrasonic power emitted by a device.

The apparatus of the preferred embodiment is able to measure total ultrasonic power delivered by a physiotherapy treatment head and can enable the performance of the physiotherapy device to be monitored on a regular, before use, basis and re-calibrated where necessary. In some embodiments, the system can measure effective radiating area of a transducer and/or local hot-spots in time-averaged acoustic intensity (beam non-uniformity).

The preferred embodiments can provide the potential for a compact measuring system which is lower cost and easier to use.

An embodiment of the present invention is described below, by way of example only, with reference to the accompanying drawing, in which the sole FIGURE is a schematic representation of a preferred embodiment of measurement device, showing only the principal components thereof.

Referring to the FIGURE, the experimental set-up envisaged for the preferred embodiment and the principle of operation are now described. In the FIGURE, there is provided a casing forming a chamber 16 which is open at an upper side thereof. Within the chamber 16 there is provided a pyroelectric element 12, which in this embodiment is in the form of a thin membrane of thickness of around 0.040 mm or around 0.1 mm formed of polyvinylidene fluoride (pvdf). The film 12 overlies and is backed by an acoustical absorber layer 14 which, in this embodiment, is formed from polyurethane rubber material.

In this embodiment, water is used in a well configuration 10 to overlie the film or membrane 12 and serves to couple an ultrasonic beam emitted by a treatment head 18 to the measuring sensor, namely the pvdf membrane 12. Alternatively, instead of water another coupling member could be used such as a coupling gel. In either case, electrically insulating layer(s) should be provided between the film 12 and the water. These may be formed from thin layers of plastic film (e.g. polyethylene) or rubber material.

In the preferred embodiment the pvdf membrane 12 is a thin film to ensure that acoustic reflections back to the face of the treatment head are small. If these are significant, the treatment head may change its output power leading to error in the measurements. Very approximately, the thickness of the membrane 12 is preferably thinner that the acoustic wavelength in water which is 1.5 mm at 1 MHz and 0.5 mm at 3 MHz.

In use, the incident ultrasonic beam will heat the material of the acoustical absorber 14 which is so designed that it absorbs substantially all of the acoustic energy within a fraction of a millimeter of the interface between the membrane 12 and itself. The pyroelectric film 12, in this embodiment the pvdf film, is used to sense this increase in temperature.

The chamber 16 may include electronic circuitry 20 which can obtain an indication of the power being generated. Suitable circuitry will be immediately apparent to the skilled person so is not described in detail herein. In one example, the circuitry 20 includes a d.c. peak detection unit arranged to detect the peak value at switch on of the treatment head 18 under test, with the actual protocol for the measurements being the subject of routine experimentation. Measurements should only take one or a few seconds.

The absorption coefficient of ultrasound in the acoustical absorber 14 has been designed in the preferred embodiment such that the vast majority of the ultrasonic power incident on the interface between the thin pvdf membrane 12 and absorber 14 is absorbed. This absorbed acoustic energy manifests itself as heat and, due to the pyroelectric effect of the pvdf membrane 12, the resultant rate of temperature rise is measured as a d.c. voltage across the electrodes of the pvdf membrane 12 which is measured.

The local rate of temperature rise is proportional to the time-averaged acoustic intensity and when integrated over the whole beam (which will be the case when, in comparison to the size of the ultrasonic beam, the pvdf sensor area is large) this will provide a d.c. output which is proportional to the ultrasonic power being generated by the treatment head 18. A suitable display (not shown) can be provided to display the results of the measurement.

In the preferred embodiment, the system measures the rate of temperature rise by detecting a peak in output voltage from the membrane 12. This peak in temperature rise will typically occur very soon after switch on of the device 18 under test because subsequent to this, thermal conduction will cause the rate of temperature increase to decrease.

The acoustical absorber 14 plays an important role within the device. At an acoustic frequency of 1 MHz, approximately 82% of the acoustic power is absorbed within 1 mm of the of the front surface of the absorber 14. At 3 MHz, this increases to 99%.

The solid-state power meter design of the preferred embodiment is aimed at the physiotherapy ultrasound field. Acoustic powers generated by this type of equipment generally lie within the range 0.5 watts to 15 watts and, from the initial testing carried out, the device is sensitive enough to measure powers as low as 100 mW.

The application range could be extended to measure diagnostic systems where the generated acoustic powers are lower (5 mW–200 mW).

The primary advantages of the described embodiment are as follows:

a) the system can be compact and lightweight, for example 100 mm outside diameter and 40 mm deep;

b) the material costs can be relatively low;

c) the device can be very easy to use, with the 'well' shaped device being filled with water, the face of the treatment head placed under the water surface (roughly perpendicular to the top surface of the sensor) and the electrical drive to the treatment head switched on for a reading then to be taken;

d) lateral alignment of the treatment head is not critical—it may be positioned over any region of the pvdf membrane 12 and this should nominally produce substantially identical results and prevent the excessive build-up of heat.

Many other variations are possible. For example, the transducer 18 may be directly coupled without the water path 10 using coupling gel and can be located above, within or below the absorber 14 whilst still directing its acoustic beam at the pvdf membrane. In principle, more complex electrode patterns (consisting of, for example, multi-elements) could be used to obtain intensity distribution information within the beam. Clearly, this would result in a consequent increase in the complexity of the resultant instrument. For example, for the detection of effective radiating area (ERA) of a transducer 18 only part of the pvdf membrane may contribute to the output signal through the existence of a small area of high absorption in contact with the member 12. This may be in the shape of a circular disk of diameter 1 mm or so, which can then be moved relative to the radiating area of the transducer 18 to determine the intensity output profile and in particular power intensity over the radiating area. Alternatively, the member 12 could be formed by a plurality of elements, for example as a two-dimensional array of discrete pyroelectric devices, as a series of strips or as a series of concentric rings. These alternative arrangements would allow the effective radiating area of the transducer to be detected or local hot-spots to be detected.

The membrane 12 could be formed of other substances which exhibit a pyroelectric effect, including piezoelectric material. Examples are ceramic materials such as lithium niobate and quartz. The advantage of pvdf, however, is that is deformable, is available in this layers of thickness much less than the acoustic wavelength and is an excellent acoustic impedance match to water.

Similarly, the element 12 need not be in the form of a membrane and need not be located above the absorber 14, that is between the absorber and the device 18 under test. For example, the membrane could be located below the absorber 14, although this would result in loss of sensitivity of the member 12. In other embodiments, the member 12 could be located adjacent a wall of the chamber 16 or could form part of the wall. In other embodiments, the member 12 could be a central element, for example a strip located within the absorber 14.

The circuitry required to measure the voltage output may be separate from the chamber 16; a wide range of circuitry may be used including, but not restricted to, peak detection, integration, digitisation and subsequent processing by computer or other means.

What is claimed is:

1. Apparatus for measuring at least one of ultrasonic power and ultrasonic intensity generated by a device, comprising: an element including a material having a pyroelectric effect, wherein the element overlies an ultrasonic absorber in thermal contact with the element and a measurement device operable to measure ultrasonic power generated by a device and absorbed by the absorber using the pyroelectric effect of the element.

2. Apparatus according to claim 1, wherein the element comprises a thin film.

3. Apparatus according to claim 2, further comprising a chamber in which the absorber is located.

4. Apparatus according to claim 2, further comprising a transfer medium operable to transfer ultrasonic power generated by a device to the absorber.

5. Apparatus according to claim 1, further comprising a chamber in which the absorber is located.

6. Apparatus according to claim 1, further comprising a transfer medium operable to transfer ultrasonic power generated by a device to the absorber.

7. Apparatus according to claim 6, wherein the transfer medium comprises water.

8. Apparatus according to claim 1, wherein the element is formed from polyvinylidene fluoride.

9. Apparatus according to claim 1, wherein the element is formed from a piezoelectric material.

10. Apparatus according to claim 1, wherein the element has a thickness of substantially 0.04 to 0.1 millimeters.

11. Apparatus according to claim 1, wherein the absorber is formed from a polyurethane material.

12. Apparatus according to claim 1, wherein the absorber is formed from a polyurethane rubber.

13. Apparatus according to claim 1, further comprising a transfer medium operable to transfer ultrasonic power generated by a device to the absorber.

14. Apparatus according to claim 1, further comprising a chamber, wherein the element overlies the absorber in the chamber.

15. Apparatus according to claim 1, wherein the measurement device is operable to measure a rate of temperature rise of the element.

* * * * *